United States Patent
Oshima et al.

(10) Patent No.: US 8,711,411 B2
(45) Date of Patent: Apr. 29, 2014

(54) PRINT CONTROL SERVER, PRINT CONTROLLING METHOD, AND PRINT CONTROL PROGRAM

(75) Inventors: Yasuhiro Oshima, Nagano-ken (JP); Hirotaka Akamatsu, Nagano-ken (JP); Yasuhiro Furuta, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 127 days.

(21) Appl. No.: 13/352,650

(22) Filed: Jan. 18, 2012

(65) Prior Publication Data

US 2012/0188600 A1 Jul. 26, 2012

(30) Foreign Application Priority Data

Jan. 21, 2011 (JP) .................................. 2011-010577
Jan. 31, 2011 (JP) .................................. 2011-017632

(51) Int. Cl.
*G06F 3/12* (2006.01)

(52) U.S. Cl.
USPC ......... 358/1.15; 358/1.1; 358/1.13; 358/1.12; 709/206; 709/220

(58) Field of Classification Search
None
See application file for complete search history.

(56) References Cited

U.S. PATENT DOCUMENTS

| | | | |
|---|---|---|---|
| 8,023,132 B2 * | 9/2011 | Henry et al. .................. 358/1.15 |
| 8,161,124 B2 * | 4/2012 | Yoshida et al. ............... 709/206 |
| 8,218,190 B2 * | 7/2012 | Kanaya et al. ............... 358/1.18 |
| 2003/0033451 A1 * | 2/2003 | Yoshida et al. ................... 710/8 |
| 2003/0103221 A1 * | 6/2003 | Natori ............................. 358/1.9 |
| 2006/0082807 A1 | 4/2006 | Tanaka et al. |
| 2008/0068646 A1 | 3/2008 | Kobayashi |
| 2008/0151294 A1 * | 6/2008 | Natori et al. ................. 358/1.15 |
| 2008/0307059 A1 | 12/2008 | Ono |
| 2013/0060950 A1 * | 3/2013 | Furuta et al. ................. 709/227 |

FOREIGN PATENT DOCUMENTS

EP    1 158 413 A1    11/2001
JP    2008-071257 A    3/2008

* cited by examiner

*Primary Examiner* — Ashish K Thomas

(57) ABSTRACT

A print control server includes a print request receiving section which receives an e-mail to an e-mail address assigned to a specific printer as a print request; an induction section which transmits identification information related to the print request to a source of the print request by an e-mail; a print control demand receiving section which transmits the print control page related to the print request after acquiring a print control page demand based on the identification information, and receives a print execution demand to the print request related to the print control page; a data conversion section which creates the print data based on the print request; and a print data transmission section which transmits the print data to the specific printer depending on the print execution demand.

8 Claims, 8 Drawing Sheets

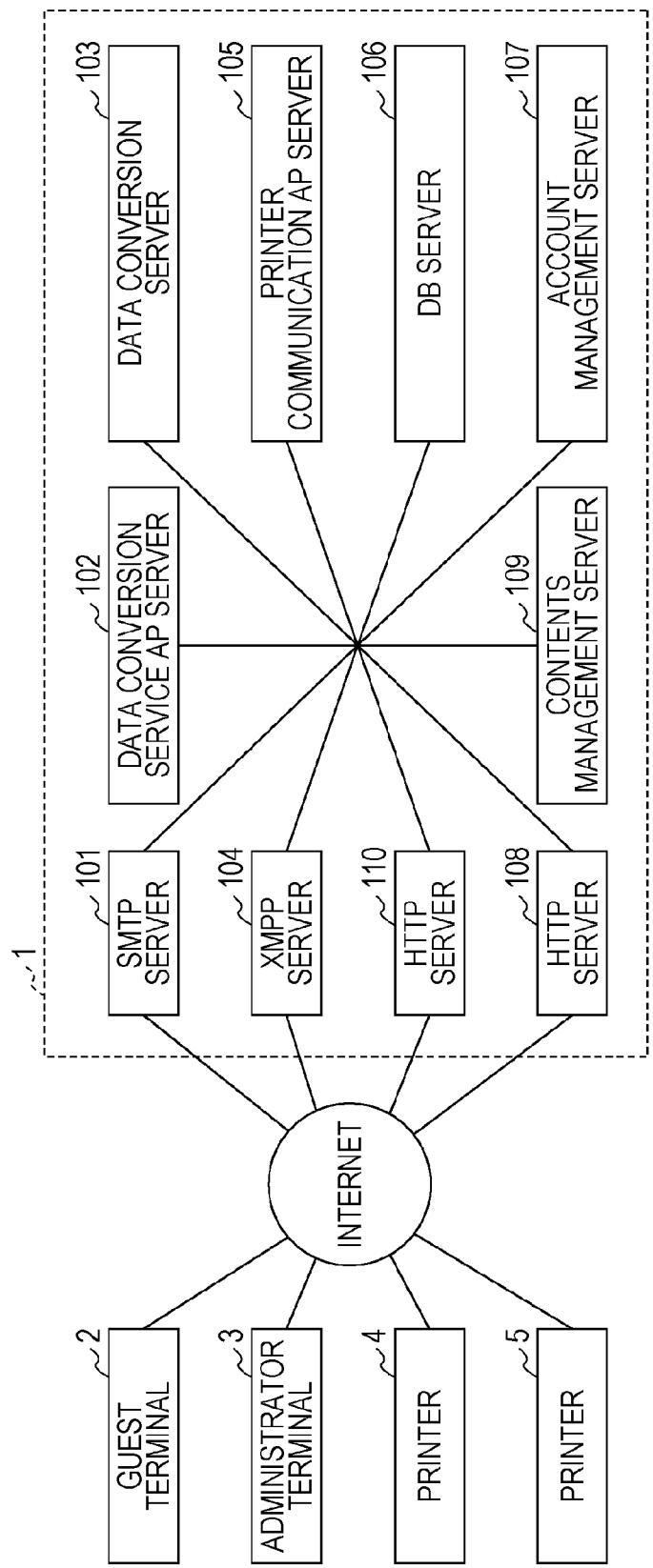

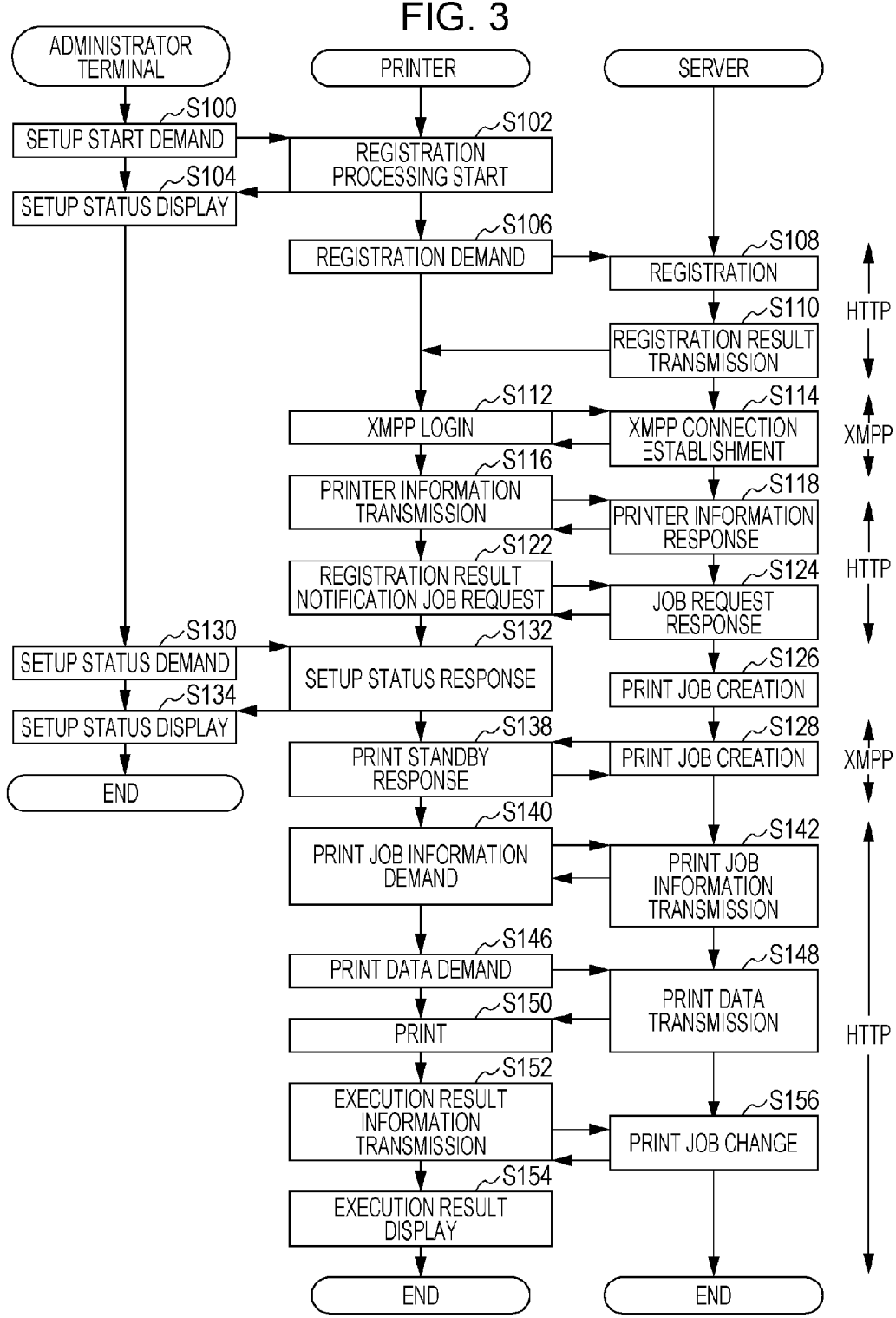

PRINT CONTROL SERVER, PRINT CONTROLLING METHOD, AND PRINT CONTROL PROGRAM

CROSS REFERENCES TO RELATED APPLICATIONS

The entire disclosure of Japanese Patent Application Nos. 2011-010577, filed Jan. 21, 2011, and 2011-017632, filed Jan. 31, 2011, are incorporated by reference herein.

BACKGROUND

1. Technical Field

The present invention relates to a print control server, a print controlling method, and a print control program. Particularly, the invention relates to a cloud computing system that is able to print a text or an attached file of an e-mail by transmitting the e-mail to an e-mail address associated with a printer.

2. Related Art

In the related art, a cloud computing system is known which includes a function of receiving the e-mail and printing the text or the attached file of the e-mail (for example, JP-A-2008-71257). The cloud computing system (hereinafter, simply referred to as a print system) includes a server which creates print data corresponding to a specific printer based on the text or the attached file of the e-mail when receiving a specific e-mail, and a printer which acquires the print data from the server to execute the printing. Thus, a user of the print system is able to use a printer even in a case where a printer driver is not installed to a client such as a PC (Personal Computer), and a smart phone.

In the print system, when a registration processing of the printer including an assignment of an e-mail address for receiving the print target to the printer is performed in the server, a user is able to use the printer by transmitting the e-mail by using the e-mail address as a destination.

However, in such a print system of the related art, there is a problem in that a user who transmits the e-mail to request the printing is unable to perform a print control such as cancelling an erroneous transmission, changing a print setting, or confirming a preview image, by a simple method.

SUMMARY

An advantage of some aspects of the invention is to allow the print control by a simple method in a cloud computing system which is able to print at least one of a text and an attached file of an e-mail by transmitting the e-mail to an e-mail address associated with a printer.

(1) According to an aspect of the invention, there is provided a print control server that includes a print request receiving section which receives an e-mail destinated to an e-mail address assigned to a specific printer as a print request; an induction section which transmits identification information related to the print request to a source of the print request by an e-mail; a print control demand receiving section which acquires a print control page demand related to the identification information from the source of the print request, transmits the print control page related to the print request to the source of the print control page demand when acquiring the print control page demand, and receives a print execution demand corresponding to the print request related to the print control page; a data conversion section which creates the print data based on at least one of the text and the attached file of the print request; and a print data transmission section which transmits the print data to the specific printer depending on the print execution demand.

According to the invention, since the print control page is transmitted from the server to the source of the print request, a user who transmits the print request is able to determine whether the printing is executed or stopped by operating the print control page.

(2) In the print control server according to an embodiment of the invention, the print control demand receiving section may receive the designation of the print setting together with the print execution demand, and the data conversion section may create the print data based on at least one of the text and the attached file of the print request and the received print setting.

In the case of adopting the configuration, a user who transmits the print request can designate the print setting.

(3) In the print control server according to the embodiment of the invention, the data conversion section may also create a preview data depending on the print setting based on at least one of the text and the attached file of the print request, in addition to the print data, and a preview image based on the preview data may be laid out in the print control page.

In the case of adopting the configuration, since the print control page with the laid-out preview image is transmitted from the server to the source of the print request, a user who transmits the print request can confirm the preview image depending on the print setting.

(4) In the print control server according to the embodiment of the invention, the print control demand receiving section may receive a change of the print setting, a preview demand, and a print execution demand to the print request related to the print control page, newly create the preview data depending on the print condition changed to the data conversion section when receiving the change of the print setting and the preview demand, and transmit the print control page in which the preview image is laid out based on the newly created preview data.

In the case of adopting the configuration, a user who transmits the print request can be required to execute the printing after confirming the preview image depending on the change of the print setting.

(5) According to another aspect of the invention, there is provided a printing method which includes transmitting an e-mail to an e-mail address assigned to a specific printer from a terminal device to a server set including at least one server as a print request, wherein the terminal device receives the e-mail transmitted from the server set depending on the print request, acquires identification information related to the print request from the received e-mail, and performs a print control page demand to the serve set based on the identification information; the terminal device acquires and displays the print control page related to the print request depending on the print control page demand from the server set; the terminal device performs a print execution demand to the print request depending on the reception of a print instruction from a user related to the print control page in the server set; the print terminal receives the print data based on at least one of a text and an attached file of the print request transmitted from the server set depending on the print execution demand; and the print terminal prints the print data.

According to an embodiment of the invention, when communicating with the print control server to perform the printing, a user who transmits the print request can determine whether the printing setting is changed or stopped by operating the print control page by using the terminal device.

In addition, functions of each sections described in the aspect are realized by a hardware resource in which functions are specified by the configuration itself, a hardware resource in which functions are specified by a program, or a combination thereof. Furthermore, the functions of each section are not limited to being physically realized by hardware resources independent from each other. Furthermore, the server may be realized as one server device, and may be realized by the cooperation of a plurality of server devices. In addition, the invention is also valid as a device, a method, a system including the server, the terminal device and the printer mentioned above, a computer program that causes the server and the printer to realize the functions mentioned above, and a recording medium of the program. Of course, the recording medium of the computer program may be a magnetic recording medium, an optical magnetic medium, and any recording medium to be developed in future.

BRIEF DESCRIPTION OF THE DRAWINGS

The invention will be described with reference to the accompanying drawings, wherein like numbers reference like elements.

FIG. 1 is a block diagram that shows a print system.

FIG. 3 is a sequence diagram that shows a setup sequence.

DESCRIPTION OF EXEMPLARY EMBODIMENTS

Figure 2A:
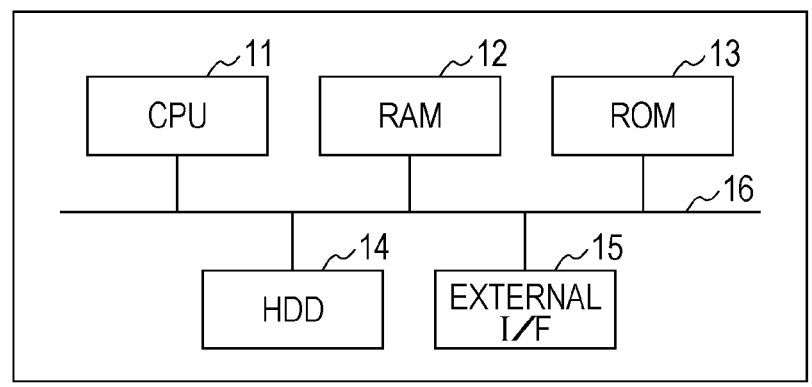
FIG. 2A is a block diagram that shows a configuration of a server.

Hereinafter, an embodiment of the invention will be described with reference to the attached drawings. Furthermore, the corresponding components in each drawing are denoted by the same reference numerals, and the overlapping descriptions will be omitted.

1. Configuration

FIG. 1 is a block diagram that shows a print system as an embodiment of the invention. The print system is constituted by a clouding computer system which is able to print a text and an attached file of an e-mail by transmitting the e-mail to an e-mail address associated with registered printers 4 and 5, and includes a print control server 1, and a plurality of printers 4 and 5.

The print control server 1 of the present embodiment includes a SMTP server 101, a data conversion service application (AP) server 102, a data conversion server 103, an XMPP server 104, a printer communication AP server 105, a DB server 106, an account management AP server 107, a HTTP server 108, a contents management AP server 109, and a HTTP server 110.

The SMTP server 101 is a server that has a function of transmitting and receiving e-mail.

The data conversion service AP server 102 as a print request receiving unit and an induction unit is an application server that has a function of extracting the text and the attached file from the e-mail received by the SMTP server 101 as the print request and delivering the text and the attached file to the data conversion server 103 as print targets.

The data conversion server 103 as the data conversion unit is a server that has a function of converting the file acquired from the data conversion AP server 102 as the print target into preview data or print data.

The DB server 106 is a data base server that manages various pieces of information of the printers 4 and 5, and stores the print data and the preview data.

The XMPP server 104 is a server that has a function of transmitting and receiving various parameters by communicating with the printers 4 and 5 by the use of the XMPP.

The printer communication AP server 105 as the print data transmission unit is an application server that has a function of crating print standby information or the like.

The account management AP server 107 as the print control request receiving unit is an application server that relays the HTTP server 110 and another server, and has a function of registering the printers 4 and 5 in the print system or crating the print control page.

The HTTP server 108 is a server that has a function of communicating with the printers 4 and 5 by the use of the HTTP.

The contents management AP server 107 is an application server that relays the HTTP server 108 and another server, and has a function of acquiring the printing job from the DB server 106 and delivering the same to the HTTP server 108 or the like.

The HTTP server 110 is a server that has a function of communicating with a guest terminal 2 as a terminal device and an administrator terminal 3 as a terminal device by the use of the HTTP.

As shown in FIG. 2A, each of the SMTP server 101, the data conversion service AP server 102, the data conversion server 103, the XMPP server 104, the printer communication AP server 105, the DB server 106, the account management AP server 107, the HTTP server 108, the contents management AP server 107, and the HTTP server 110 includes a CPU 11, a RAM 12, a ROM 13, a hard disk device (HDD) 14, an external interface (I/F) 15, and an internal interface (I/F) 16 connecting them to each other. A boot program is stored in the ROM 13. An operating system (OS) and a computer program for realizing the respective functions mentioned above are stored in the HDD 14. Such a program is loaded to the RAM 12 and is executed by the CPU 11. The external I/F 15 includes an interface for being connected with another server, printers 4 and 5, a guest terminal 2, an administrator terminal 3 or the like via the Internet, an interface for being connected with a peripheral device or the like.

Figure 2B:
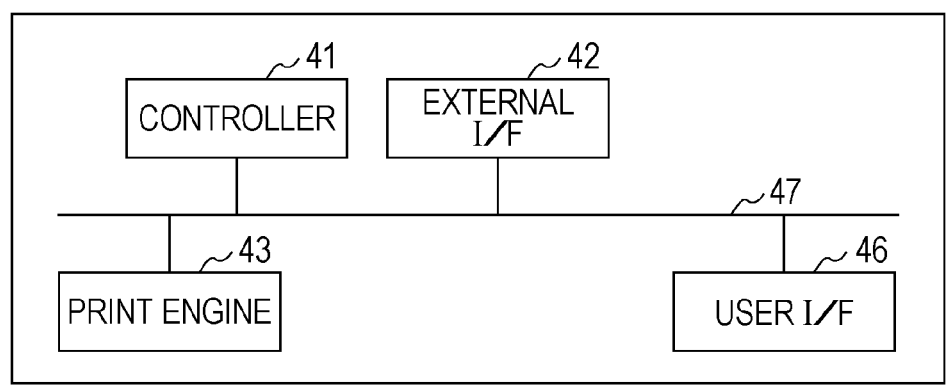
FIG. 2B is a block diagram that shows a configuration of a printer.

As shown in FIG. 2B, the respective printers 4 and 5 include a controller 41, an external I/F 42, a user I/F 46, a printing engine 43, and an internal I/F 47 connecting them to each other. The controller 41 is constituted by a CPU, a nonvolatile memory, a RAM, an ASIC or the like, and executes the processing for controlling the operation of the printing engine 43 by executing the print program stored in the nonvolatile memory. Furthermore, the controller 41 executes the processing for communicating with the terminal 3 and the print control server 1 by executing the web service program stored in the nonvolatile memory, registering the printers 4 and 5 in the print control server 1, or acquiring the print data from the print control server 1. The print engine 43 includes an actuator for executing the printing by a known printing method such as an ink jet method or a laser method, a sensor, a driving circuit, and a mechanical component. The external I/F 42 includes an interface for being connected with the print control server 1 and the administrator terminal 3 via an internet. The user I/F 46 is an operation panel constituted by a display, an operation key or the like.

Furthermore, although it is not shown, the guest terminal 2 and the administrator terminal 3 are computers that include a CPU, a nonvolatile memory, a RAM, a user interface or the like and are able to communicate with the print control server 1, the printers 4 and 5 or the like. In addition, the guest terminal 2 and the administrator terminal 3 may be the same device.

2. Setup Sequence

The printers 4 and 5 are built in the print system and are able to execute the printing according to the print request to be received by the print server 1, by being registered in the print control server 1. FIG. 3 is a diagram that shows a setup sequence for registering the printers 4 and 5 in the print control server 1. The present embodiment describes an example which registers the printer 4 in the print control server 1 by operating the administrator terminal 3 constituted by a PC (Personal Computer) owned by an owner of the printer 4.

Firstly, the administrator 3 executing a web browser or the like transmits the setup start demand to the printer 4 by communicating with the printer 4 by the use of HTTP (S100). For example, the administrator terminal 3 transmits a DNS mode, a primary DNS, a secondary DNS, a proxy mode, an address of the proxy server, and a photo number of the proxy server as a setup start demand to a URL of the printer 4 corresponding to the setup start demand by the use of the HTTP.

The printer 4 acquired the setup start demand starts a registration processing, and transmits the registration state information to the administrator terminal 3 (S102). The registration state information includes success or failure of the reception (success/failure), the DNS mode, the primary DNS, the secondary DNS, the proxy mode, the address of the proxy server, the photo number of the proxy server, a web service mode URS, a registration state (registered/unregistered) of the printer 4 to the printer control server 1, a URL of the management page corresponding to the printer 4, a login password of the management page corresponding to the printer 4, an e-mail address assigned to the printer 4, a connection state between the HTTP server 108 and the printer 4, and a connection state between XMPP server 104 and the printer 4. At this stage, since the registration of the printer 4 to the print control server 1 is not performed, the registration state information including a registration state "non-registration" is transmitted to the administrator terminal 3.

The administrator terminal 3 received the registration state information displays a setup status on a screen based on the received state information (S104). At this stage, for example, a text and an image indicating the state of being setup are displayed on a screen of the administrator terminal 3 by a browser.

The printer 4 transmitted the registration state information according to the setup start demand transmits a model-specific ID of the printer 4, a serial number of the printer 4, and a deletion flag of existing information as the registration demand corresponding to the printer 4 to the URL of the HTTP server 108 corresponding to the registration demand by the use of HTTP (S106).

The print control server 1 acquired the registration demand in the HTTP server 108 registers the printer 4 in the print control server 1 as an output device of the print system based on the registration demand (S108).

Specifically, the account management AP server 107 that acquired the parameter of the registration demand from the HTTP server 108 allocates the internal ID corresponding to the model-specific ID and the serial number of the printer 4, the XMPP login password, the URL of the administration page, the administration page password, and the e-mail address to the printer 4, while referring to the registration information of another printer registered in the DB server 106 in advance. Even in a case where the serial number is assigned to the printer by different schemes for each model by allocating the internal ID based on the model-specific ID and the serial number of the printer 4, it is possible to reliably allocate the different internal ID for each printer unit to the printer 4. The administration page is a web page for editing information stored in the DB server 106 by the use of the HTTP.

Moreover, the account management AP server 107 stores the XMPP login password, the URL of the management page, the administration page password, and the e-mail address on the DB server 106 in association with the internal ID corresponding to the model-specific ID and the serial number of the printer 4, as registration information of the printer 4.

In addition, the account management AP server 107 registers the e-mail address assigned to the printer 4 in the SMTP server 101. By registering the e-mail address assigned to the printer 4 in the SMTP server 101, the print control server 1 is able to receive the e-mail as the print request setting the printer 4 as the output device.

Furthermore, the account management AP server 107 registers the internal ID and the XMPP login password assigned to the printer 4 in association with each other in the XMPP server 104. The XMPP JID, in which the XMPP server 104 communicates with the printer 4 by the use of the XMPP, is an "XMPP domain name of an internal ID "@" XMPP server 104". By registering the internal ID and the XMPP login password of the printer 4 in the XMPP server 104 as the XMPP connection information, the printer 4 is able to communicate with the print control server 1 by the use of XMPP. In addition, in the case of providing a plurality of XMPP servers in the print control server 1 for the load distribution, there is a need to allocate the XMPP server corresponding to the printer for each printer and register the same in the DB server 106.

The account management AP server 107, in which the printer 4 is registered in the print control server 1 as the output device of the print system, transmits the registration result information of the printer 4 to the printer 4, which is a source of the registration request, via the HTTP server 108 (S110). The registration result information includes the internal ID assigned to the printer 4, the XMPP login password, the URL of the management page, the management page password, the e-mail address, the domain name of the XMPP server 104, and success or failure of reception of the registration demand (success/failure). In addition, in the case of providing a plurality of XMPP servers in the print control server 1 for the load distribution, there is a need to notify the domain name of the XMPP server assigned to the printer 4 to the printer 4. However, in a case where the XMPP server, with which all the printers registered in the print control server 1 communicate, is common, there is no need to necessarily notify the domain name of the XMPP server to the printer 4.

The printer 4, which acquires the registration result information from the HTTP server 108, stores the internal ID assigned to the printer 4, the XMPP login password, the URL of the management page, the management page password, the e-mail address, and the domain name of the XMPP server 104 on the nonvolatile memory, creates the XMPP JID from the internal ID and the XMPP domain name, and transmits the XMPP JID and the XMPP login password to the XMPP server 104 as the XMPP connection information (S112).

The XMPP server 104, which acquires the XMPP JID and the XMPP login password from the printer 4, establishes the XMPP connection with the printer 4, and transmits the XMPP connection result (success/failure) to the printer 4 (S114). At this time, when the XMPP connection succeeds, the XMPP connection between the printer 4 and the XMPP server 104 is continued until the power to the printer 4 is interrupted.

When the XMPP connection with the print control server 1 is established, the printer 4 transmits the printer information to the HTTP server 108 (S116). The printer information includes the internal ID assigned to the printer 4, a version of communication specification, menu type information of the printer (destination information), sub menu type information of the printer (destination information), and language information of the printer, and is transmitted to the URL of the HTTP server 108 corresponding to the printer information by the use of the HTTP. By transmitting the printer information including the language information or the like to the print control server 1, it is possible to create the print data such as a registration report depending on the destination of the printer 4, and the print report in the print control server 1.

The When the HTTP server 108 receives the printer information from the printer 4, the contents management AP server 107 stores the printer information in the DB server 106 in association with the internal ID, and transmits the reception result (success/failure) to the printer 4 of the source (S118). The printer information of the printer 4 is stored in the DB server 106 until the XMPP connection with the printer 4 is finished.

The printer 4, which receives the reception result (success) of the printer information, transmits a registration result notification job creation request to the HTTP server 108 (S122). The registration result notification job is a print job for printing the registration content of the printer 4 to the print control server 1 by the printer 4. Specifically, the internal ID is transmitted to the URL of the HTTP server 108 corresponding to the registration result notification job creation request as the registration result notification job creation request.

The HTTP server 108, which receives the registration result notification job creation request, transmits the reception result (success/failure) to the printer 4 of the source (S124).

When transmitting the reception result (success) of the registration result notification job creation request from the HTTP server 108, the print control server 1 creates the registration result notification job for printing a registration report by the printer 4 (S126). Specifically, firstly, the contents management AP server 107 acquires the internal ID of the printer 4 from the registration result notification job creation request, acquires information to be notified to a user of the administrator terminal 3 such as the URL of the management page stored in association with the acquired internal ID, the management page password, and the e-mail address, and the device-specific ID of the printer 4 stored in association with the internal ID from the OB server 106, and delivers the same to the printer communication AP server 105. Next, the printer communication AP server 105 requests the data conversion service AP server 102 for the creation of the print data for printing information to be notified to a user of the administrator terminal 3 as a registration report by the printer 4 in association with the job ID and the model ID. The requested data conversion service AP server 102 creates the print data corresponding to the model-specific ID in the data conversion server 103. Next, the printer communication AP server 105 acquires the print data from the data conversion server 103 and stores the same as the print job of the printer 4 in the DB server 106 in association with the internal ID and the job ID.

The print control server 1 crating the registration result notification job notifies an occurrence of new print job to the printer 4 of the source of the registration request by the use of XMPP (S128). Specifically, the printer communication AP server 105 notifies print standby information indicating an occurrence of new print job of the printer 4 via the XMPP server 104 to the printer 4. At this time, the XMPP server 104 specifies a partner of the XMPP communication to the printer 4 based on the internal ID acquired from the printer communication AP server 105, and transmits the print standby information to the printer 4 by the use of XMPP. In this manner, since the print standby information is transmitted by the use of XMPP, the print control server 1 can autonomously perform the processing after the print job is created, until the print standby information is transmitted to the printer 4 and thus, there is no need for polling from the printer 4. Thus, it is possible to immediately notify the creation of the print job to the printer 4, and it is possible to notify the creation of the print job to the printer 4 by a minimum communication amount.

The printer 4 acquired the print standby information transmits and receives the reception result (success/failure) to and from the XMPP server 104 by the use of XMPP (S138).

Next, the printer 4 request the print control server 1 of the print job information required for acquiring the print data (S140). Specifically, the printer 4 transmits the internal ID of the printer 4 to the URL of the HTTP server 108 corresponding to the demand of the print job information by the use of the HTTP.

The print control server 1 received the demand of the print job information transmits the reception result (success/failure), the job ID, the URL of the HTTP server 108 corresponding to the job ID, and the type of the page description language of the print page to the printer 4 as the print job information (S142). Specifically, the contents management AP server 107 acquires the internal ID acquired by the HTTP server 108 as a demand of the print job information, acquires the job ID stored in association with the internal ID, the print data, and the page description language of the print data from the DB server 106, and delivers the same to the HTTP server 108. The HTTP server 108 creates the URL receiving the acquisition demand of the print data corresponding to the job ID, and transmits the reception result (success/failure), the job ID, the URL the acquisition demand of the print data, and the type of the page description language of the print data to the printer 4 as the print job information by the use of the HTTP.

The printer 4 which acquired the print job information waits until the printer 4 enters an idle state, and when entering the idle state, the printer 4 demands the print data (S146). Specifically, the printer transmits the internal HTTP of the printer 4 as the acquisition demand of the print data to the URL of the HTTP server 108 receiving the acquisition demand of the print data via the HTTP.

The print control server 1 demanded for the print data transmits the reception result (success/failure) and the demanded print data to the printer 4 by the use of the HTTP (S148). Specifically, the HTTP server 108 transmits the print data corresponding to the URL receiving the demand of the print data and the reception result to the printer 4 by the use of the HTTP.

The printer 4 acquired the print data executes the printing of the registration report based on the print data (S150).

The printer 4, in which the printing has been finished, transmits the execution result information to the HTTP server 108 (S154). Specifically, the printer 4 transmits the internal ID of the printer 4, the job ID executed the printing, the execution result (success/failure) of the print job, a generated reason of the execution result (normal, a paper jam, running out of ink or the like) to the URL corresponding to the execution result information of the HTTP server 108 (S152).

The print control server 1, which acquired the execution result information in the HTTP server 108, renews the print job based on the execution result information (S156). Specifically, the HTTP server 108 transmits the reception result (success/failure) of the execution result information to the printer 4, and the contents management AP server 107 deletes the print data corresponding to the job ID from the DB server 106, based on the execution result information received by the HTTP server 108.

During execution of the setup sequence mentioned above, the administrator terminal 3 which transmitted the setup start demand regularly demands of the printer 4 the setup status (S130). Specifically, the administrator terminal 3 transmits the status of setup to the URL of the printer 4 corresponding to the demand of the setup status.

The printer 4 received the demand of the setup status transmits the registration state information to the administrator terminal 3 by the use of the HTTP (S132). The registration state information is the same as the content transmitted to the administrator terminal 3 by the printer 4 in S102 immediately after acquiring the setup start demand.

Like S104, the administrator terminal 3 received the registration state information displays the registration state based on the received registration state information on a screen (S134). In the step in which the registration of the printer 4 to the print control server 1 is completed, for example, the URL of the management page, the management page password, the e-mail address or the like are displayed on the screen of the administrator terminal 3.

In the setup sequence mentioned above, in the process of registering the printer 4 in the print control server 1 while being connected to the printer 4 by the use of the HTTP (Hyper Text Transfer Protocol) and XMPP (eXtensible Messaging and Presence Protocol), success or failure of the reception of the registration demand, the registration result information, the XMPP connection result, the reception result of the printer information, and the reception result of the registration result notification job creation request are transmitted from the print control server 1 to the printer 4. Such information indicates whether the HTTP connection and XMPP connection between the printer 4 and the print control server 1 succeed, and whether the registration required for processing the print demand of the printer 4 by the print control server 1 is performed. Thus, the printer 4 can prints success or failure of the connection between the printer 4 and the print control server 1, and success or failure of the registration of the printer 4 to the print control server 1, or can display then on the display of the user I/F 46. For this reason, by transmitting the e-mail to the e-mail address associated with the printer 4, it is possible to reliably to notify a user whether or not the printer 4 is registered in the print system which is a cloud computing system capable of printing the text or the attached file of the e-mail.

3. Login Sequence

Figure 4:
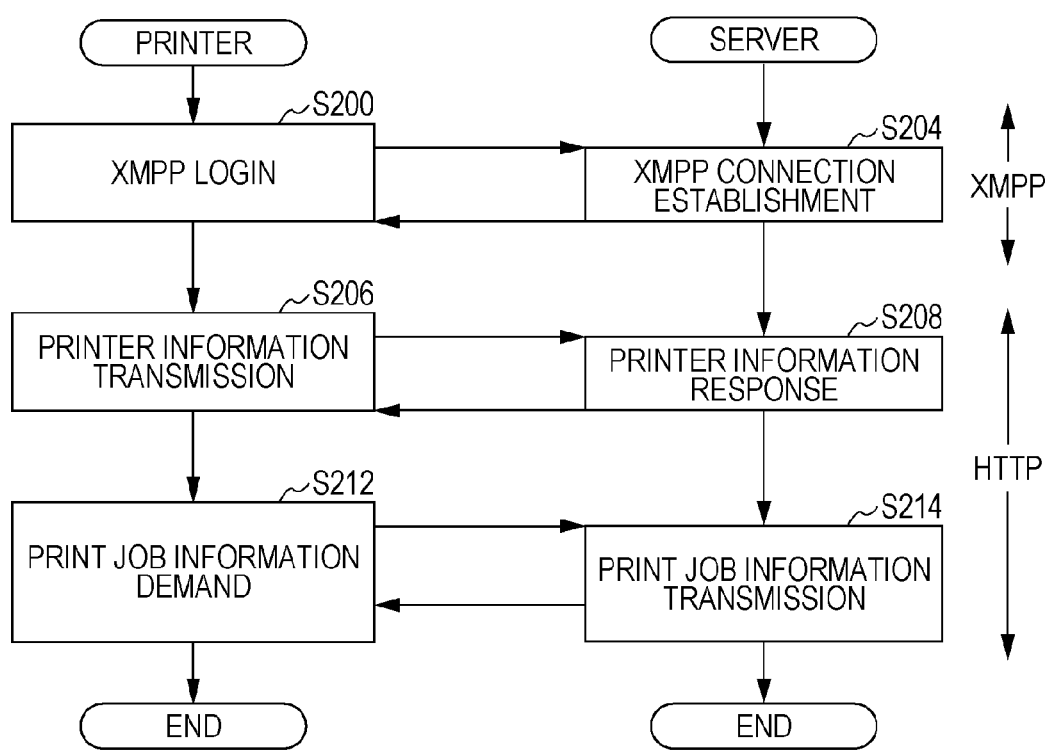
FIG. 4 is a sequence diagram that shows a login sequence.

FIG. 4 is a diagram that shows a login sequence. The login sequence is started when a user presses a power button of the printer 4 to interrupt the power and then presses the power button again to turn on the power. In the login sequence, the printer 4 performs the initialization processing of each section, establishes the XMPP connection with the print control server 1, and confirms the print job.

Specifically, like the setup sequence S112, the printer 4 transmits the XMPP connection information to the XMPP server 104 (S200). The XMPP server 104 acquired the XMPP connection information establishes the XMPP connection like S114 (S204).

The printer 4, which established the XMPP connection with the print control server 1, transmits the printer information to the print control server 1 by the use of the HTTP, like S116 of the setup sequence (S206). That is, the transmission of the printer information is performed whenever the XMPP connection is established between the printer and the print control server 1. The server acquired the printer information transmits the reception result to the printer 4 by the use of the HTTP, like S118, and stores the printer information until the XMPP connection is finished (S208).

The printer 4, which transmitted the printer information to the print control server 1, demands the print control server 1 of the print job information by the use of the HTTP, like S140 of the setup sequence (S212). The print control server 1 acquired the demand of the print job transmits the print job information to the printer 4 by the use of the HTTP, like S142 (S214). If there is a print job, the printer 4 which acquired the print job information demands the print data to execute the printing. In this manner, the printer 4 automatically acquires the print job information after the power is turned on, whereby the printer 4 is able to execute the print job created in the print control server 1 in the process of blocking the power immediately after putting the power.

4. Print Sequence

Figure 5:
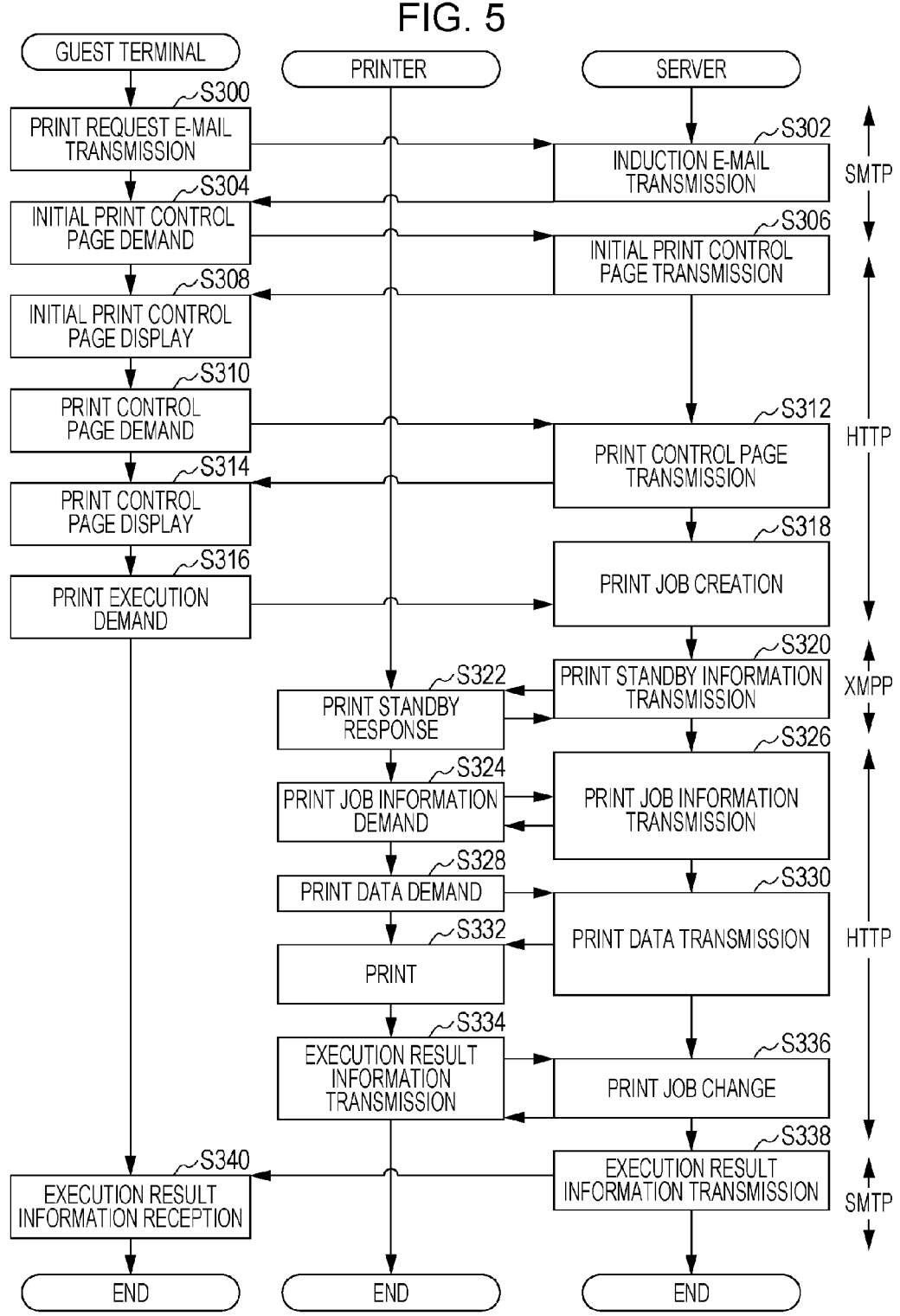
FIG. 5 is a sequence diagram that shows a print sequence.

FIG. 5 is a diagram that shows a print sequence. The print sequence is started by transmitting the e-mail as the print request from the administrator terminal 3 or the guest terminal 2 to the registered e-mail address (S300). As described later, the print control server 1 processes the text and the attached file of the e-mail received in the registered e-mail address as the print target. For this reason, when a user transmits the e-mail by using the print target as the text or the attached file, the e-mail is processed by the print control server 1 as the print request. As described above, the destination e-mail addresses of the print request different from each other for each printer is screen-displayed in the administrator terminal 3 in the setup sequence, or is printed by the printer 4. Thus, an administration user, who registers the printer 4 in the print control server 1 by the use of the administrator terminal 3, and a guest user, who is notified of the e-mail address from the administration user, can transmit the print request of the printer 4 to the print control server 1 by the use any terminal connected to the internet. Hereinafter, the e-mail as the print request is transmitted from the guest terminal 2 to the e-mail address corresponding to the printer 4.

Figure 6:
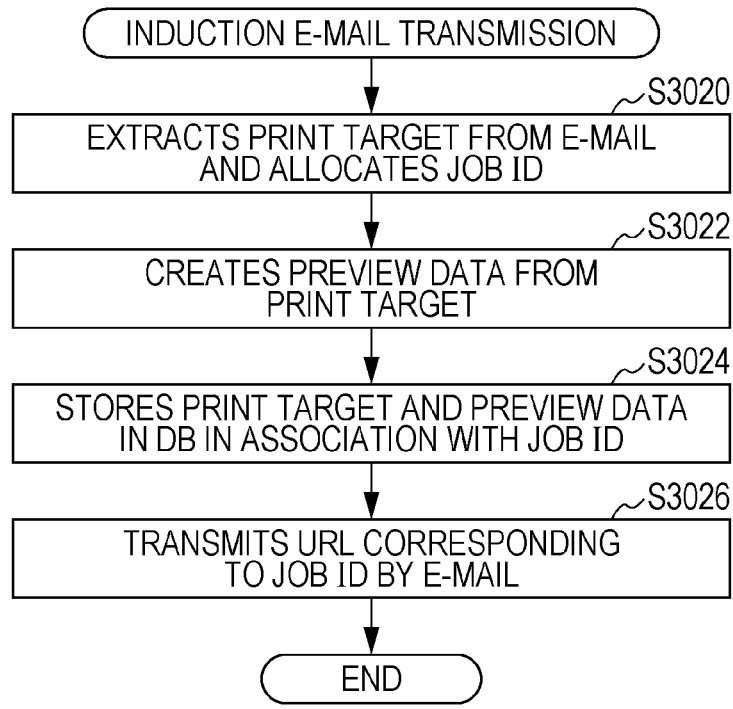
FIG. 6 is a flowchart that shows an induction e-mail transmission processing.

When receiving the print request, the print control server 1 transmits the induction e-mail including the URL as identification information related to the print request to the source of the print request (S302). Hereinafter, the details of the transmission processing of the induction e-mail are also described with reference to the flow chart of FIG. 6.

The e-mail as the print request is received by the SMTP server 101. When the SMTP server 101 receives the e-mail addressed the registered e-mail address, the data conversion service AP server 102 specifies the internal ID related to the print request from the e-mail address received the print request, acquires and analyzes the e-mail from the SMTP server 101, extracts the text and the attached file to which the data conversion server 103 corresponds as the print target, and allocates the internal ID and the job ID to the extracted print target for each file (S3020). Herein, the data conversion service AP server 102 specifies the internal ID related to the print request, that is, the internal ID assigned to the printer 4, by acquiring the internal ID related to the destination e-mail address of the print request from the DB server 106. In addition, when the e-mail is attached with the attached file to which the data conversion server 103 does not correspond, the e-mail using the source of the print request as the destination is transmitted and the error is notified, without allocating the internal ID and the job ID to the attached file. Moreover, the internal ID and the job ID are assigned only to the text, and the attached file to which the data conversion server 103 corresponds.

Next, the data conversion service AP server 102 creates the preview data for each job ID by the use of the data conversion server 103 (S3022). Specifically, the data conversion service AP server 102 specifies the internal ID and the model ID of the printer 4 corresponding to the e-mail address which is the destination of the e-mail by referring to the DB server 106. Next, the data conversion service AP server 102 delivers the initial print setting and the print target in association with each other to the data conversion server 103. The data conversion server 103 converts each of the acquired print targets into the preview data depending on the initial print setting.

Next, the data conversion service AP server 102 stores the print target and the preview data on the DB server 106 in association with the internal ID and the job ID (S3024).

Next, the data conversion service AP server 102 includes the URL of the HTTP server 110 corresponding to the job ID in the text, creates the induction e-mail using the source of the print request as the destination, and transmits the same to the guest terminal 2 via the SMTP server 101 (S3026). The data conversion service AP server 102 associates the URL with the print request by including the job ID in the URL included in the text of the induction e-mail. When a plurality of print targets is extracted from the print request the URL included in the induction e-mail is associated with the job ID assigned to the printed target extracted initially. In this manner, the URL partially including the job ID is referred to as the induction URL. As mentioned above, the details of the transmission processing of the induction e-mail have been described.

When a user of the guest terminal 2 received the induction e-mail opens the induction e-mail and clicks the induction URL, initial print control page request is transmitted to the print control server 1 (S304). Specifically, a mail user agent of the guest terminal 2 displayed the text of the induction e-mail transmits the induction URL as the initial print control page request via a web browser by the user of the HTTP.

Figure 7:
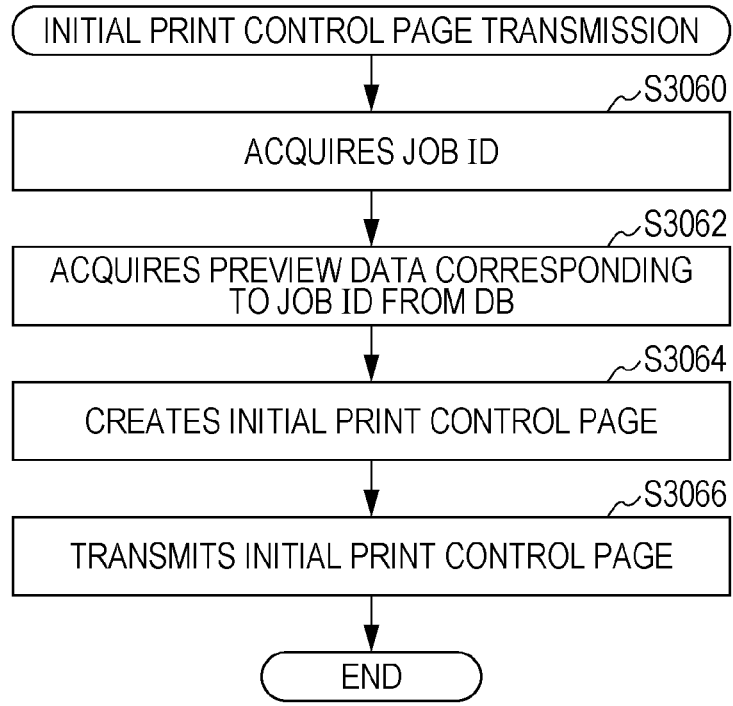
FIG. 7 is a flow chart that shows an initial print control page transmission processing.

The print control server 1, which acquired the print control page request in the induction URL, transmits the initial print control page related to the print request to the guest terminal 2 of the source of the initial control page demand (S306). Hereinafter, the details of the transmission processing of the initial print control page will also be described with reference to the flow chart of FIG. 7.

The initial print control page demand is acquired in the induction URL by the HTTP server 110. When the HTTP server 110 acquires the initial print control page demand, the account management serve 107 acquires the job ID from the induction URL (S3060).

Next, the account management AP server 107 acquires the preview data related to the job ID from the DB server 106 (S3062).

Next, the account management AP server 107 creates the initial print control page (S3064). The initial print control page is transmitted to the initial print control page demand among the print control pages shown in FIGS. 8A and 8B. The print control pages include a text print control page corresponding to a text-based print target shown in FIG. 8A, and an image print control page corresponding to an image-based print target shown in FIG. 8B. The account management AP server 107 determines which print control page is generated, based on the extension of the file to be printed.

Figure 8A:
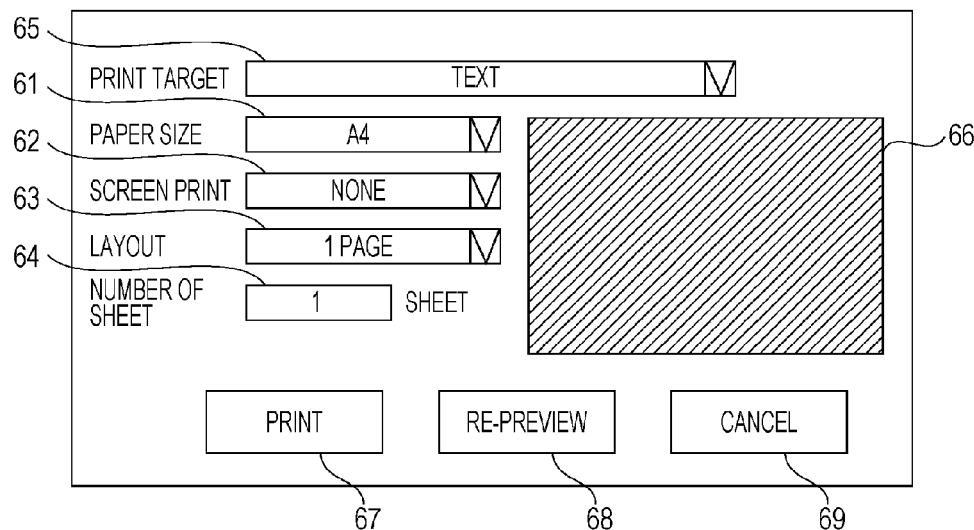
FIG. 8A is a screen configuration diagram that shows a print control page for a text.

As shown in FIG. 8A, on the text print control page, a setting target selecting drop-own list 65, a paper size selecting drop-own list 61, a duplex print selecting drop-down list 62, a layout selection drop-down list 63, a copy number selecting text box 64, a print button 67, a re-preview button 68, a cancellation button 69, and a preview image 66 are placed.

Figure 8B:
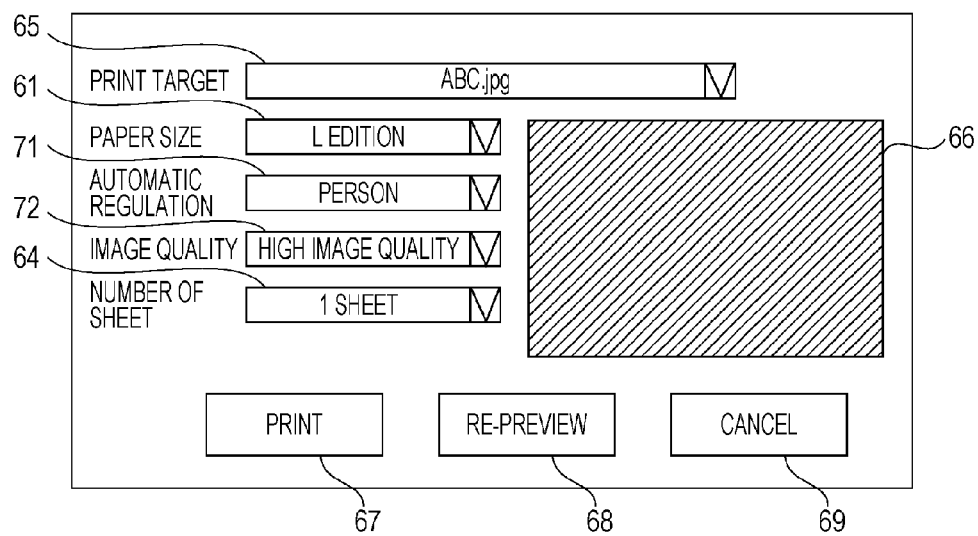
FIG. 8B is a screen configuration diagram that shows a print control page for an image.

As shown in FIG. 8B, on the image print control page, the setting target selecting drop-down list 65, the paper size selecting drop down list 61, an automatic image quality adjustment selecting drop-down list 71, an image quality selecting drop-down list 72, the copy number selecting text box 64, the print button 67, the re-preview button 68, the cancellation button 69, and the preview image 66 based on the preview data.

When the initial print control page is created, the items corresponding to the predetermined initial print setting are selected in the paper size selecting drop-down list 61, the duplex print selecting drop-down list 62, the layout selecting drop down list 63, the copy number selecting text box 64, the automatic image quality adjustment selecting drop-down list 71, and the image quality selecting drop-down list 72. The setting target selecting drop-down list 65 is to select the job ID in which the print setting is changed by the drop-down list. When the initial print control page is created, in a case where there is a plurality of print targets corresponding to one print request, the initially assigned job ID becomes a selection item of the setting target selecting drop-down list 65, and a file name of the print target corresponding to the job ID is displayed.

Next, the account management AP server 107 transmits the initial print control page to the source of the initial print control page demand via the HTTP server 110 (S3066). As mentioned above, the details of the transmission processing of the initial print control page have been described.

When the initial print control page is transmitted from the print control server 1, the initial print control page is displayed by the web browser of the guest terminal 2 (S308). A use of the guest terminal 2 can select the job ID which changes the print setting by the operation of the setting target selecting drop-down list 65 of the initial print control page, can change the print setting by operating the drop-down lists 61, 62, 63, 65, 71, and 72 of the initial print control page and the text box 64, can transmit the print execution demand by clicking the print button 67 of the initial print control page, and can demand the print control page in which the preview image of another job ID and the preview image corresponding to the print setting after the change are laid out by clicking the re-preview button 68. In addition, even if the re-preview button 68 is not clicked, the print control page may be demanded in which the preview image of another job ID and the preview image corresponding to the print setting after the change are laid out, depending on the operation of any item.

Herein, the re-preview button 68 is clicked in the state in which the selection item is changed by the operation of the drop-down list 63. As a consequence, the print control page demand is transmitted from the guest terminal 2 to the print control server 1 (S310). The print control page demand is a HTTP request which transmits the selection item of the drop-down lists 61, 62, 63, 65, 71, and 72 and a numerical value of the text box 64 to the induction URL embedded in the re-preview button 68.

Figure 9:
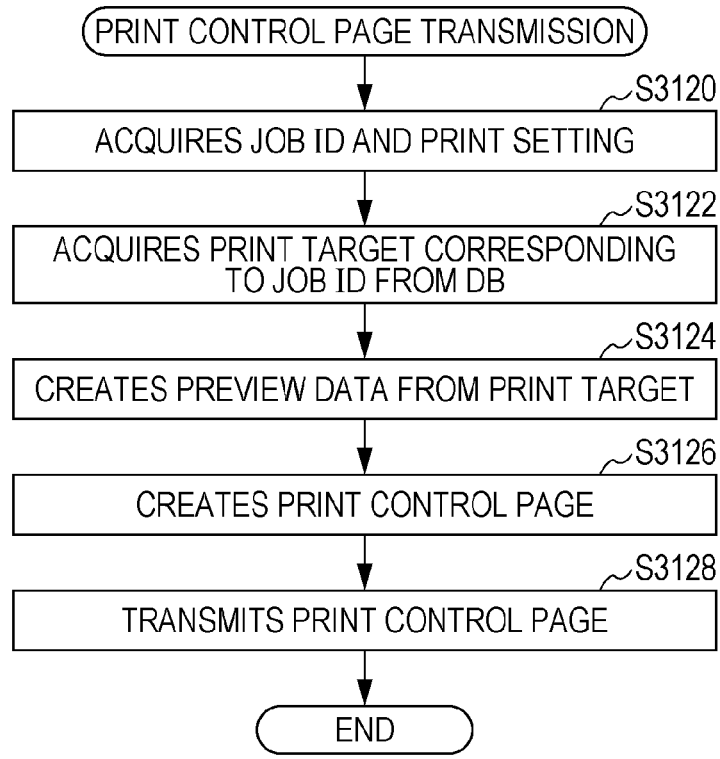
FIG. 9 is a flow chart that shows a print control page transmission processing.

The print control server 1 which acquired the print control page demand in the induction URL embedded in the re-preview button 68, transmits the print control page related to the print request to the guest terminal 2 which is the source of the print control page demand (S312). Hereinafter, the details of the transmission processing of the print control page will also be described with reference to the flow chart of FIG. 9.

The print control page demand is acquired by the HTTP server 110. When the HTTP server 110 acquires the print control page demand, the account management AP server 107 acquires the job ID and the print setting from the print control page demand (S3120). The job ID corresponds to the selection item of the setting target selecting drop-down list 65. The print setting corresponds to the selection items of the drop-down lists 61, 62, 63, 71, and 72 and the numerical value of the text box 64.

Next, the account management AP server 107 acquires the print target related to the job ID acquired in S3120 from the DB server 106 (S3122). Furthermore, at this time, the account management AP server 107 deletes the preview data related to the job ID from the DB server 106.

Next, the account management AP server 107 creates the preview data of the print target depending on the print setting by the use of the data conversion server 103 (S3124). Specifically, the account management AP server 107 delivers the print target acquired from the DB server 106 and the print setting acquired from the print control page demand in association with each other to the data conversion server 103. The data conversion server 103 converts the acquired print target into the preview data depending on the acquired printing setting.

Next, the account management AP server 107 creates the print control page in which the preview image 66 based on the newly created preview data is laid out (S3126). When the print control page is created, the item corresponding to the print setting acquired from the print control page demand is selected in the paper size selecting drop-down list 61, the duplex print selecting drop-down list 62, the layout selecting drop-down list 63, the copy number selecting text box 64, the automatic image quality adjustment selecting drop-down list 71, and the image quality selecting drop-down list 72. In the selecting target selecting drop-down list 65, the job ID acquired from the print control page demand is selected, and the file name corresponding to the job ID.

Next, the account management AP server 107 transmits the print control page to the source of the print control page demand via the HTTP server 110 (S3128). As mentioned above, the details of the transmission processing of the print control page will be described.

When the print control page is transmitted from the print control server 1, the print control page is displayed by the web browser of the guest terminal 2 (S314). Similar to the state in which the initial print control page is displayed, a user of the guest terminal 2 can select the job ID which changes the print setting by the operation of the setting target selecting drop-down list 65 of the print control page, can change the print setting by operating the drop-down lists 61, 62, 63, 64, 71, and 72 of the print control page and the text box 64, can transmit the print execution demand by clicking the print button 67 of the print control page, and can demand the print page in which the preview image of another job ID and the preview image corresponding to the print setting after the change are laid out by clicking the preview button 68 again. That is, the processing depending on the operation of the initial print control page is exactly the same as the processing corresponding to the operation of the print control page.

Now, the print button 67 is clicked. In this case, the print execution demand is transmitted from the guest terminal 2 to the print control server 1 (S316). The print execution demand is a HTTP request that transmits the selection item of the drop-down lists 61, 62, 63, 65, 71, and 72 and the numerical value of the text box 64 to the induction URL embed in the print button 67. When there is a plurality of print targets, the clicking of the print button 67 is received for each print target and the print execution demand is transmitted for each print target. However, the setting performed for each print target may be stored, and the print execution demand may be transmitted to all the print targets depending on one click of the print button 67. In addition, any check box may be removed from the print target, for example, by providing a check box which does not print the print page, by allowing "0" in the copy number setting, or the like.

Figure 10:
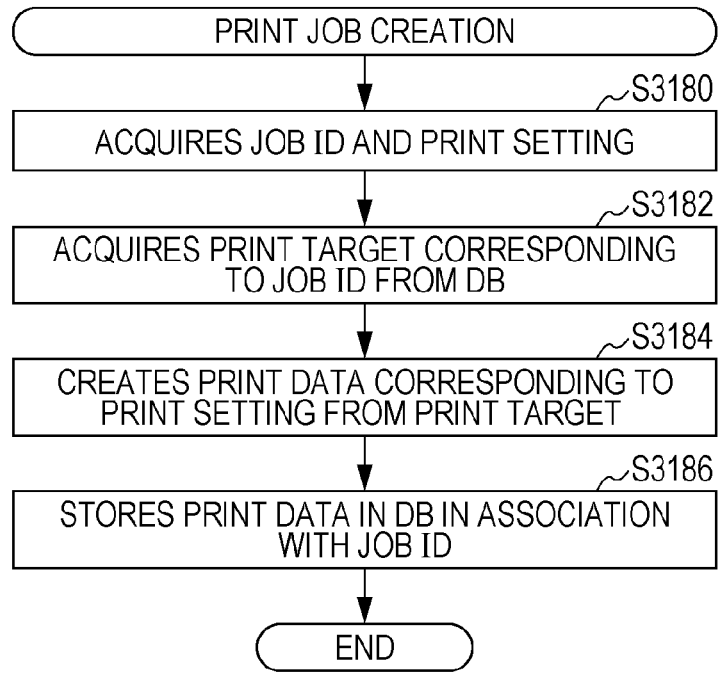
FIG. 10 is a flow chart that shows a printing job creation processing.

The print control server 1, which required the print execution demand in the induction URL embedded in the print button 67, creates the print job depending on the print execution demand (S318). Hereinafter, the creation processing of the print job will be described with reference to the flow chart of FIG. 10. In addition, when there is a plurality of print targets, the print execution demand of all print targets is acquired, or after acquiring the print execution demand of a partial print target, waits until a timeout, and then the print jobs depending on all the acquired print execution demand are sequentially created.

The print execution demand is acquired by the HTTP server 110. When the HTTP server 110 acquires the print execution demand, the account management AP server 107 acquires the job ID and the print setting from the print execution demand. Next, the account management AP server 107 delivers the acquired job ID and the print setting to the printer communication AP server 105 (S3180).

Next, the printer communication AP server 105 acquires the print target and the model ID corresponding to the acquired job ID from the DB server 106 (S3182).

Next, the printer communication AP server 105 creates the print data depending on the model and the print setting from the acquired print target by the use of the data conversion server 103 (S3184). Specifically, the printer communication AP server 105 delivers the acquired print target, the print setting, and the model ID to the data conversion server 103. Next, the data conversion server 103 converts each of the acquired print targets into the print data corresponding to the model of the printer 4 and the print setting, based on the model ID and the print setting. At this time, the data conversion server 103 creates the print data by a text-specific page description language if the print target is a text base. The data conversion server 103 creates the print data by an image-specific page description language if the print target is an image base. Whether the print target is the text base or the image base is determined based on the extension of the file acquired as the print target. When the print data is created, the printer communication AP server 105 stores the print data on the DB server 106 as the print job of the printer 4 by being associated with the internal ID and the job ID of the printer 4.

Next, the print control server 1 transmits the print standby information of the print control server 1 to the guest terminal 2, which is a client of the print execution demand, by the use of the XMPP (S320). Specifically, like S128 of the setup sequence, the printer communication AP server 105 notifies the print standby information to the printer 4 by the use of the XMPP. In this manner, since the print standby information is transmitted by the use of the XMPP, the print control server 1 can autonomously execute the processing after the print request is received and until the print standby information is transmitted to the printer 4, and there is no need for polling from the printer 4. For this reason, the creation of the print job can immediately be notified to the printer 4, and the creation of the print job can be notified to the printer 4 by a minimum communication amount.

The printer 4 acquired the print standby information transmits the reception result (success/failure) to the XMPP server 104 by the use of the XMPP, like S138 of the setup sequence (S322).

Next, like S140, the printer 4 demands the print control server 1 of the print job information required for acquiring the print data by the use of the HTTP (S324). Specifically, the printer 4 transmits the internal ID of the printer 4 to the URL of the HTTP server 108 corresponding to the demand of the print job information by the use of the HTTP.

Like S142, the print control server 1 received the demand of the print hob information transmits the reception result (success/failure), the job ID, the URL of the HTTP server 108 corresponding to the job ID, and the type of the page description language of the print job as the print job information to the printer 4, by the use of the HTTP (S326). When the print target includes a plurality of files, the ID and the URL for each file are transmitted to the printer 4 as the print job information.

Like S146, the printer 4 acquired the print job information waits until the printer 4 enters an idle state, and, when entering the idle state, the printer 4 demands the transmission of the print data by transmitting the URL receiving the acquisition demand of the print data to the HTTP server 108 (S328). At this time, when a plurality of job IDs is included in the acquired print job information, the printer 4 demands the transmission of the print data for each job ID.

The HTTP server 108, which is demanded for the transmission of the print job, like S148, transmits the reception result (success/failure), and the print data associated with the URL receiving the acquisition demand of the print data to the printer 4 by the sue of the HTTP (S330).

Like S150, the printer 4 acquired the print data executes the printing based on the print data (S332).

Like S154, the printer 4 finished the printing transmits the execution result information of the print job to the HTTP server 108 (S334).

The print control server 1, which acquired the execution result information in the HTTP server 108, renews the print job based on the execution result information, like S156, and deletes the preview data corresponding to the print job in which the execution is completed (S336). Herein, the contents management AP server 107 deletes the preview data stored in the DB server 106 in association with the job ID acquired from the execution result information, thereby deleting the preview data corresponding to the print job in which the execution is completed.

Next, the print control server 1 transmits the execution result (success/failure) to the guest terminal 2, which is the source of the print request, by the e-mail (S338). Specifically, the contents management AP server 107 creates the e-mail which sets the text indicating success or failure of the printing and the print target, in which the printing is completed or fails, as a text, and sets the destination as the guest terminal 2 which is the source of the print request, and transmits the created e-mail to the guest terminal 2 via the SMTP server 11.

When the guest terminal 2 receives the e-mail (S340), a user of the guest terminal 2 can know the processing result of the print request.

The processes from S328 to S340 are executed for each print job in the sequence stored in the DB server 106. For example, when the acquired print job information includes the job ID corresponding to the e-mail text, and the job ID corresponding to the attached file "A", and the print job corresponding to the e-mail text is previously stored in the DB server 106, the printer 4 acquires the print data corresponding to the e-mail text to execute the printing by transmitting the first URL corresponding to the e-mail text to the HTTP server 108, and transmits the execution result information to the HTTP server 108. When the HTTP server 108 receives the execution result information, the contents management AP server 107 deletes the print job corresponding to the e-mail text from the DB server 106, based on the execution result information acquired from the HTTP server 108. Moreover, the contents management AP server 107 transmits the completion of the print job corresponding to the e-mail text to the guest terminal 2 by the e-mail via the SMTP server 101.

Next, the printer 4 acquires the print data corresponding to the attached file "A" to execute the printing by transmitting a second URL corresponding to the attached file "A" to the HTTP server 108, and transmits the execution result information to the HTTP server 108. When the HTTP server 108 receives the execution result information, the contents management AP server 107 deletes the print job corresponding to the attached file from the DB server 106, based on the execution result information acquired from the HTTP server 108. Moreover, the contents management AP server 107 transmits the completion of the print job corresponding to the attached file to the guest terminal 2 by the e-mail via the SMTP server 101.

In addition, when the cancellation button 69 of the print control page is clicked, the print stop demand is transmitted from the guest terminal 2 to the print control server 1, and in the print control server 1, the preview data and the print target are deleted from the DB server 106.

In the print sequence mentioned above, since the print control page allowing a change in print setting by the use of the web browser is transmitted to the source of the print request, a user who transmitted the print request can change the print setting by a simple method. Furthermore, since the preview image is laid out in the initial print control page and the print control page, a user who transmitted the print request can demand the print execution after confirming the preview image. Furthermore, when changing the print setting in the first print control page and the print control page, the print execution can be demanded after confirming the preview image depending on the print setting after the change.

5. Another Embodiment

Furthermore, a technical scope of the invention is not limited to the embodiments mentioned above, but various modifications can of course be added within the scope not departing from the gist of the invention, in addition to the embodiments and a combination thereof described later.

For example, in the embodiment mentioned above, an example has been described in which the administrator terminal 3 is operated and the printer 4 is registered to the print control server 1, but a user may operate the user I/F 46 of the printer 4 and register the printer 4 to the printer control server 1.

Furthermore, in the e-mail of the print request, only one of the text or the attached file may be printable, and the other thereof may be unprintable.

Furthermore, when the processing up to S336 mentioned above is completed in all print jobs to be created depending on the print request received from the guest terminal 2, the execution result (success/failure) of all print requests may be transmitted from the print control server 1 to the guest terminal 2, which is the source of the print request, by one e-mail.

Furthermore, in the embodiment mentioned above, an example has been described in which the printer 4 automatically executes the print job when receiving the print standby information from the print control server 1, but, for example, information indicating the existence of the print job may be displayed on the user I/F 46 of the printer 4 which received the print standby information, and the printer 4 may execute the print job after waiting for the execution instruction of the print job by a user.

Furthermore, in the above embodiment, an example has been described in which the print control server 1 is constituted by a plurality of physically independent server computers, the function of the print control server 1 can also be realized by a single server computer.

Furthermore, in regard to a communication protocol between the printer 4 and the print control server 1, the print standby information may be transmitted from the print control server 1 to the printer 4 by a push type protocol (a protocol that does not requires the demand from a client so as to execute the processing from the server to the client), a push type communication protocol different from the XMPP may be used, a part of the communication using the HTTP may be replaced by another pull type communication protocol (a protocol in which the processing from the server to the client is necessarily executed depending on the demand from the client), and a part of the communication using the HTTP may be replaced by the XMPP and another push type protocol.

Furthermore, an example has been described in which the induction URL includes the job ID so as to associate the print request with the print control page and the print setting. However, the job ID as a parameter of the HTTP message may be transmitted or received between the print control server and the source of the print request, and the print request may be associated with the print control page and the print setting by the job ID.

Furthermore, in regard to the print control page acquired from the server by the guest terminal, in the e-mail of the print request, any of the text print control page and the image print control page may be selectable. Specifically, as the e-mail address receiving the print request, the e-mail address corresponding to the text-based print target and the e-mail address corresponding to the image-based print target may be assigned to the printer, and the transmission processing of the print control page and the creation processing of the print job may be divided depending on the e-mail address received the print request. Furthermore, any of a predetermined character sting corresponding to the text or a predetermined character string corresponding to the image may be described in the text of the e-mail as the print request, and it may be determined that the print target needs to be processed as any of the text and the image, by analyzing the text of the e-mail in the server. Otherwise, the processing may similarly be performed without distinguishing between the text and the image.

In addition, in regard to the print control page acquired from the server by the guest terminal, the layout and the displaying element are not limited to those described above, and for example, the preview images of all print targets may be placed on one screen to individually perform the print setting, and the print setting may be collectively performed in all print targets.

Furthermore, after the print control server 1 transmits the induction e-mail to the source of the print request, or after the print control server 1 transmits the print control page to the source of the print control page demand, in a case where there is no response for a predetermined time, the timeout processing may be performed. The timeout processing may be processing of considering that the print request is cancelled and deleting the data to be printed, the preview data or the like, and on the contrary, the timeout processing may be processing of considering that the print execution demand is made and performing the process after S320 which creates the print job in the print setting set at that time. In addition, "print setting set at that time" is the initial value of the print setting in a case where there is no response for a predetermined time after transmitting the induction e-mail to the source of the print request.

Furthermore, the terminal device may receive the instruction of a user by the use of a mouse, a touch panel or the like, may receive the instruction by voice by the use of a voice recognition function, and may receive the instruction by other methods.

What is claimed is:

1. A print control server comprising:
a print request receiving section which receives an e-mail addressed to an e-mail address assigned to a specific printer as a print request;
an induction section which transmits identification information related to the print request to a source of the print request by an e-mail, the identification information being used to transmit a print control page demand;
a print control demand receiving section which receives the print control page demand from the source of the print request based on the transmitted identification information, transmits the print control page related to the print request to the source of the print control page demand after acquiring the print control page demand, and receives a print execution demand corresponding to the print request related to the print control page;
a data conversion section which creates a print data based on at least one of a text and an attached file of the print request; and
a print data transmission section which transmits the print data to the specific printer in response to the print execution demand.

2. The print control server according to claim 1,
wherein the print control demand receiving section receives designation of a print setting together with the print execution demand, and
the data conversion section creates the print data based on at least one of the text and the attached file of the print request and the received print setting.

3. The print control server according to claim 2,
wherein the data conversion section also creates a preview data depending on the print setting based on at least one of the text and the attached file of the print request, in addition to the print data, and
a preview image based on the preview data is laid out in the print control page.

4. The print control server according to claim 3,
wherein the print control demand receiving section receives a change in print setting, a preview demand, and a print execution demand corresponding to the print request related to the print control page, newly creates a preview data in response to the print condition changed to the data conversion section after receiving the change in print setting and the preview demand, and transmits the print control page, in which the preview image based on the newly created preview data is laid out, to the source of the print control page demand.

5. The print control server according to claim 1,
wherein the data conversion section also creates a preview data depending on the print setting based on at least one of the text and the attached file of the print request in addition to the print data, and
a preview image based on the preview data is laid out in the print control page.

6. A print controlling method peformed by a print server the, print controlling method comprising:

receiving an e-mail addressed to an e-mail address assigned to a specific printer as a print request;

transmitting identification information related to the print request to a source of the print request by an e-mail, and receiving from the source of the print request a print control page demand based on the transmitted identification information, transmitting the print control page related to the print request to the source of the print control page demand after receiving the print control page demand, and receiving a print execution demand corresponding to the print request related to the print control page;

creating a print data based on at least one of a text and an attached file of the print request; and transmitting the print data to the specific printer depending on the print execution demand.

7. A printing method comprising:

transmitting an e-mail to an e-mail address assigned to a specific printer from a terminal device to a server set including at least one server as a print request, wherein the terminal device receives an e-mail transmitted from the server set depending on the print request, acquires identification information related to the print request from the received e-mail, and performs a print control page demand to the server set based on the identification information, the terminal device acquires and displays the print control page, related to the print request depending on the print control page demand, transmitted from the server set, the terminal device performs a print execution demand to the server set depending on the reception of a print instruction from a user, the specific printer receives the print data based on at least one of a text and an attached file of the print request transmitted from the server set in response to the print execution demand, and the specific printer prints the print data.

8. The print control server according to claim 1, wherein the identification information is a URL for demanding the print control page.

\* \* \* \* \*